US008261538B2

(12) United States Patent
Kistner et al.

(10) Patent No.: US 8,261,538 B2
(45) Date of Patent: Sep. 11, 2012

(54) COMPACT EXHAUST GAS AFTERTREATMENT SYSTEM

(75) Inventors: Andreas Kistner, Merkendori (DE); Andreas Döring, Munich (DE)

(73) Assignee: MAN Nutzfahrzeuge AG, Munich (DE)

( * ) Notice: Subject to any disclaimer, the term of this patent is extended or adjusted under 35 U.S.C. 154(b) by 765 days.

(21) Appl. No.: 12/372,863

(22) Filed: Feb. 18, 2009

(65) Prior Publication Data
US 2009/0205325 A1 Aug. 20, 2009

(30) Foreign Application Priority Data

Feb. 19, 2008 (DE) .................. 10 2008 010 071

(51) Int. Cl.
*F01N 3/00* (2006.01)
(52) U.S. Cl. ............... 60/295; 60/286; 60/296; 60/301; 60/322
(58) Field of Classification Search ............... 60/286, 60/322, 301
See application file for complete search history.

(56) References Cited

U.S. PATENT DOCUMENTS

| 4,902,487 | A | | 2/1990 | Cooper et al. | |
|---|---|---|---|---|---|
| 5,367,875 | A | * | 11/1994 | Aboujaoude et al. | 60/303 |
| 6,173,568 | B1 | | 1/2001 | Zürbig et al. | |
| 6,415,603 | B1 | * | 7/2002 | Nowka et al. | 60/322 |
| 6,610,506 | B1 | | 8/2003 | Lo et al. | |
| 6,805,849 | B1 | | 10/2004 | Andreasson et al. | |
| 6,843,966 | B1 | | 1/2005 | Mahr | |
| 6,928,807 | B2 | | 8/2005 | Jacob et al. | |
| 7,509,799 | B2 | * | 3/2009 | Amou et al. | 60/286 |
| 7,614,214 | B2 | * | 11/2009 | Yan | 60/286 |
| 2002/0151231 | A1 | | 10/2002 | Nakase | |
| 2006/0010859 | A1 | * | 1/2006 | Yan et al. | 60/286 |
| 2006/0179825 | A1 | * | 8/2006 | Hu et al. | 60/297 |
| 2007/0056268 | A1 | * | 3/2007 | McCarthy | 60/286 |
| 2007/0089403 | A1 | * | 4/2007 | Pfeifer et al. | 60/286 |
| 2008/0041050 | A1 | * | 2/2008 | Doring | 60/605.1 |
| 2008/0041052 | A1 | * | 2/2008 | Doring et al. | 60/612 |
| 2008/0072578 | A1 | * | 3/2008 | Kumar | 60/299 |
| 2008/0250778 | A1 | * | 10/2008 | Solbrig | 60/301 |

FOREIGN PATENT DOCUMENTS

| DE | 403 8 054 | 6/1992 |
|---|---|---|
| DE | 197 40 702 | 11/1998 |
| DE | 198 55 384 | 6/2000 |
| DE | 100 02 284 | 7/2001 |
| DE | 199 60 976 | 7/2001 |
| DE | 198 16 259 | 10/2002 |

(Continued)

*Primary Examiner* — Thomas Denion
*Assistant Examiner* — Jesse Bogue
(74) *Attorney, Agent, or Firm* — Cozen O'Connor

(57) ABSTRACT

The invention is directed to a device for converting exhaust gas constituents of an internal combustion engine by means of at least one catalyzer and/or particle filter and/or particle separator and for compensating relative movements between the internal combustion engine and the exhaust gas train and/or relative movements between different parts of the exhaust gas train by means of at least one compensator permitting relative movements. The at least one catalyzer for converting exhaust gas constituents and/or the at least one particle filter and/or the at least one particle separator are/is arranged inside the compensator and or inside the part of the exhaust gas train that is permanently connected to the compensator. The outer diameter of the catalyzer and/or of the particle filter and/or of the particle separator is less than or equal to the inner diameter of the compensator.

7 Claims, 5 Drawing Sheets

FOREIGN PATENT DOCUMENTS

| | | |
|---|---|---|
| DE | 103 4 8799 | 6/2004 |
| EP | 105 2009 | 11/2000 |
| EP | 107 2 765 | 1/2001 |
| EP | 1 338 562 | 8/2003 |
| EP | 1 481 719 | 12/2004 |
| WO | WO 03/056151 | 7/2003 |

* cited by examiner

COMPACT EXHAUST GAS AFTERTREATMENT SYSTEM

BACKGROUND OF THE INVENTION

1. Field of the Invention

The subject matter of the invention is a device for converting exhaust gas constituents of an internal combustion engine by means of at least one catalyzer and/or particle filter and/or particle separator and for compensating relative movements between the internal combustion engine and the exhaust gas train and/or relative movements between different parts of the exhaust gas train by means of at least one compensator permitting relative movements.

2. Description of the Related Art

Due to increasingly stricter limits on exhaust gas which can no longer be met entirely through measures undertaken in the engine, most internal combustion engines have been outfitted in the meantime with aftertreatment systems for reducing harmful emissions.

Examples of such aftertreatment systems include
three-way catalyzers
$NO_X$ storage catalyzers
diesel oxidation catalyzers
SCR catalyzers
particle filters.

Since particle filters and SCR catalyzers represent a relatively new development, they will be explained briefly in the following.

Along with solids particles, nitrogen oxides are some of the limited components of exhaust gas which are formed during combustion processes. Permissible emissions of these components continue to be lowered. At present, various methods are employed to minimize these exhaust gas components in internal combustion engines for motor vehicles. Reduction of nitrogen oxides is usually accomplished by means of catalyzers; reductants are additionally required in oxygen-rich exhaust to increase selectivity and $NO_X$ conversion. These methods have come to be known under the umbrella term of SCR (Selective Catalytic Reduction) methods. They have been used for many years in the energy industry and more recently also in internal combustion engines. A detailed exposition of these methods is given in DE 34 28 232 A1. $V_2O_5$-containing mixed oxides, e.g., in the form of $V_2O_5/WO_3/TiO_2$, can be used as SCR catalysts. $V_2O_5$ proportions typically range between 0.2% and 3%. In practical applications, ammonia or compounds which split off ammonia such as urea or ammonia formiate are used in solid form or in solution as reductants. One mole of ammonia is needed to convert one mole of nitrogen monoxide.

$$4NO+4NH_3+O_2 \Rightarrow 4N_2+6H_2O \tag{1}$$

When a platinum-containing NO oxidation catalyzer for forming $NO_2$ is positioned in front of the SCR catalyzers $$2NO+O_2 \Leftrightarrow 2NO_2 \tag{2}$$

the SCR reaction is accelerated considerably and the low-temperature activity is markedly increased.

$$NO+2NH_3+NO_2 \Rightarrow 2N_2+3H_2O \tag{3}$$

Nitrogen oxide reduction using the SCR method in internal combustion engines operating in vehicles is difficult because of the changing operating conditions, which makes it difficult to apportion the reductant in terms of quantity. On the one hand, the greatest possible conversion of nitrogen oxides must be achieved; but on the other hand emission of unspent ammonia must be prevented. This problem is often solved by using an ammonia blocking catalyzer downstream of the SCR catalyzer to convert the excess ammonia to nitrogen and water vapor. Further, the use of $V_2O_5$ as active material for the SCR catalyzer leads to problems when the exhaust gas temperature at the SCR catalyzer exceeds 650° C. because the $V_2O_5$ is sublimated. For this reason, $V_2O_5$-free iron zeolites or copper zeolites are used for high-temperature applications. Particle separators, as they are called, or particle filters are used in power plants and vehicles to minimize fine particles. A typical arrangement with particle separators for use in vehicles is described, for example, in EP 1 072 765 A1. Arrangements of this kind differ from those using particle filters in that the diameter of the channels in the particle separator is substantially greater than the diameter of the largest occurring particle, while the diameter of the filter channels in particle filters is in the range of the diameter of the particles. Due to this difference, particle filters are subject to clogging, which increases the exhaust gas back pressure and lowers engine performance. An arrangement and a method with particle filters are shown in U.S. Pat. No. 4,902,487. A distinguishing feature of the two above-mentioned arrangements and methods is that the oxidation catalyzer—usually a catalyzer with platinum as active material—arranged upstream of the particle separator or particle filter oxidizes the nitrogen monoxide in the exhaust gas by means of the residual oxygen that is also contained to form nitrogen dioxide which is converted in turn in the particle separator or particle filter with the carbon particles to form $CO$, $CO_2$, $N_2$ and $NO$. In this way, a continuous removal of the deposited solids particles is carried out.

$$2NO_2+C \Rightarrow 2NO+CO_2 \tag{4}$$

$$NO_2+C \Rightarrow NO+CO \tag{5}$$

$$2C+2NO_2 \Rightarrow N_2+2CO_2 \tag{6}$$

Another possibility for removing the soot particles deposited in the particle separator or particle filter is to oxidize these soot particles in regeneration cycles at high temperatures with the oxygen present in the exhaust gas flow.

$$C+O_2 \Rightarrow CO_2 \tag{7}$$

In order to meet future exhaust gas regulations, it will be necessary to use arrangements for reducing nitrogen oxide emissions and arrangements for reducing fine particles emissions at the same time. Various arrangements and methods are already known for this purpose.

DE 103 48 799 A1 describes an arrangement comprising an oxidation catalyzer, a SCR catalyzer arranged downstream of the latter in the exhaust gas flow, and a particle filter which is again arranged downstream in the exhaust gas flow. The reductant for the selective catalytic reaction taking place in the SCR catalyzer is fed in immediately in front of the SCR catalyzer by a urea injection device that is controlled as a function of the operating parameters of the internal combustion engine. A disadvantage in this arrangement is that the nitrogen dioxide generated in the oxidation catalyzer is substantially completely consumed by the selective catalytic reduction in the SCR catalyzer; that is, it is no longer available for the conversion of the solids particles that have accumulated in the particle filter arranged downstream. Therefore, the regeneration of the particle filter must be carried out uneconomically through cyclical heating of the exhaust gas flow by enriching the exhaust gas flow with unconsumed hydrocarbons. This is accomplished either by enriching the combustion mixture or by injecting fuel in front of the particle filter. On the one hand, an arrangement of this kind for regenerating the particle filter is elaborate and therefore expensive. On the other hand, the cyclical regeneration of the particle filter situated at the end of the arrangement produces harmful substances again which can no longer be removed from the exhaust gas. Further, when particle filters are used, the filters can be clogged by engine oil ashes so that these filters must routinely be removed and cleaned.

U.S. Pat. No. 6,805,849 discloses another combination of a particle filter and an arrangement for selective catalytic reduction. The arrangement described therein includes an oxidation catalyzer which is arranged in the exhaust gas flow and which increases the proportion of nitrogen dioxide in the exhaust gas, a solids filter arranged downstream, a reservoir for the reducing liquid, an injection device for the reducing liquid which is arranged behind the solids filter, and a SCR catalyzer which is arranged downstream of the latter in the exhaust gas flow. While the arrangement described above allows a continuous conversion of the soot-type solid particles deposited in the solids filter by means of the nitrogen dioxide generated in the oxidation catalyzer, it has a serious drawback. The particle filter causes a cooling of the exhaust gas so that, for example, when using the reducing liquid known as AdBlue which is presently commercially available, the exhaust gas temperature, particularly after the internal combustion engine is started or when the internal combustion engine is operated in the lower output range, is too low to generate ammonia from the 33-% aqueous urea solution without the occurrence of problematic byproducts.

In connection with the decomposition of urea ($(NH_2)_2CO$) in ammonia ($NH_3$), it is known that this takes place under optimal conditions (temperatures above 350° C.) in two steps. First, thermolysis, i.e., the thermal decomposition, of urea takes place according to the following reaction:

$$(NH_2)_2CO \Rightarrow NH_3 + HNCO \quad (8)$$

This is followed by hydrolysis, that is, the catalytic decomposition, of isocyanic acid (HNCO) into ammonia ($NH_3$) and carbon dioxide ($CO_2$) according to the following reaction:

$$HNCP + H_2O \Rightarrow NH_3 + CO_2 \quad (9)$$

Due to the fact that the reductant is in the form of an aqueous solution when AdBlue is used, this water must evaporate before and during the actual thermolysis and hydrolysis.

If the temperatures during the above-mentioned reactions (8) and (9) are below 350° C. or if heating is only gradual, it is known from DE 40 38 054 A1 that chiefly solid, infusible cyanuric acid is formed through trimerization of the isocyanic acid formed in (8):

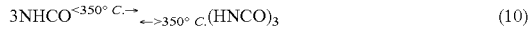
$$3NHCO \xrightarrow[{>350°\,C.}]{<350°\,C.} (HNCO)_3 \quad (10)$$

leading to clogging of the SCR catalyzer downstream. As is stated in DE 40 38 054, cited above, this problem can be remedied in that the exhaust gas flow charged with the reductant is guided through a hydrolysis catalyzer. Thus, the exhaust gas temperature at which a quantitative hydrolysis is first possible can be brought down to 160° C. The construction and composition of a corresponding catalyzer is likewise described in the above-cited publication as is the construction and operation of a SCR catalyzer system outfitted with a hydrolysis catalyzer.

In order to reduce the size of the catalyzers while maintaining a constant dwell time in the catalyzers, the hydrolysis catalyzers are also operated in a partial flow of exhaust gas that is removed from the exhaust gas flow and then fed back into it after hydrolysis. A corresponding arrangement is shown in EP 1052009 A1. In this connection, it is particularly advantageous when the partial exhaust gas flow is taken off as close as possible to the engine so that the hydrolysis catalyzer can be operated at a high temperature level. Further, in internal combustion engines charged with exhaust gas it is advantageous to remove the partial exhaust gas flow already before the turbocharger and to return it downstream of the turbocharger. However, removing the partial exhaust gas flow close to the engine and metering the reductant leads to a problem. In certain operating states of the internal combustion engine, chiefly in low-load operation, overrun operation, engine braking operation, in idling phases or when turning off the engine, a reversal of the flow direction of the exhaust gas can occur so that reductant, ammonia split off from the reductant, or byproducts formed from the reductant, e.g., isocyanic acid (Equation 9), cyanuric acid (Equation 10), and so on, can come into contact with the parts of the engine in contact with the exhaust gas due to return flows and/or diffusion in direction of the engine block. This can lead to corrosion of the materials installed in the engine block, particularly the seals.

One solution to this problem would be to arrange a catalyzer having an oxidizing activity on the decomposition products of the urea between the end position and the engine block, where these highly corrosive compounds would be destroyed in case of a return flow.

However, an additional catalyzer would exacerbate the problem of space which already exists due to the number of catalyzers that are used, the reductant injection system and the particle separators, because there is often insufficient installation space available particularly in internal combustion engines installed in vehicles.

In connection with the exhaust gas train in internal combustion engines, that is, the part which also holds the catalyzers, it is known from U.S. Pat. No. 6,610,506 to install compensators. These are flexible structural component parts which compensate for the mechanical vibrations of the engine and for the thermal expansions of the exhaust gas train. They are integrated in the exhaust gas train and, therefore, exhaust gas flows through them.

SUMMARY OF THE INVENTION

Proceeding from the prior art cited above, it is an object of the invention to arrange an exhaust gas aftertreatment system or parts of an exhaust gas aftertreatment system in the exhaust gas train in such a way that the installation space need not be increased and the pitfalls of known arrangements are avoided.

The basic idea of the invention is to minimize the space requirement for a system for exhaust gas aftertreatment by putting the existing installation space to use for multiple purposes. It was found that compensators which are usually installed in the exhaust gas train of internal combustion engines are very well suited to receive catalyzers and/or particle filters and/or particle separators. Since the installation space required by the compensators can serve double duty by accommodating the catalyzers in this way, the installation space thus gained is available for other purposes in an advantageous manner.

Due to the fact that the compensators are often installed very close to the internal combustion engine, this solution lends itself in a particularly advantageous manner to catalyzers which must be arranged very close to the engine in any case.

In an advantageous manner, the compensator element, that is, the part of the compensator permitting relative movement, can be a bellows or a corrugated hose or a sliding sleeve.

There is no limitation as to the type of catalyzer that can be integrated in the compensator. They can be, for example, three-way catalyzers, $NO_X$ storage catalyzers, SCR catalyzers, hydrolysis catalyzers, $NH_3$ oxidation catalyzers, catalyzers for oxidizing a reductant, HC oxidation catalyzers, oxidation catalyzers for generating $NO_2$ from NO, or other kinds of catalyzers. It is also conceivable to integrate any combination of two or more of the above-mentioned types of catalyzer.

The integration of catalyzers and, as the case may be, particle separators or particle filters in compensators lends itself especially to installation close to the engine. This is especially true for the hydrolysis catalyzers for decomposition of reductant which splits off ammonia and for oxidation catalyzers that are possibly arranged upstream of the latter, particularly when the ammonia or a substance splitting off ammonia is injected into a partial exhaust gas flow that branches off from the exhaust gas flow upstream of the SCR catalyzer. A reservoir for the reductant and a metering device for the reductant are usually provided for supplying the reductant (ammonia or a substance splitting of ammonia). The metering device adds the reductant to the partial exhaust gas flow, and the partial exhaust gas flow is fed back into the exhaust gas flow downstream of the feed point and upstream of the SCR catalyzer, e.g., by means of a nozzle. The SCR catalyzer arranged downstream of the feed point reduces the nitrogen oxides contained in the exhaust gas flow by means of the split-off ammonia by way of selective catalytic reduction to form nitrogen and water vapor. Located in the partial exhaust gas flow upstream of the feed point for the reductant is an oxidation catalyzer which oxidizes the ammonia and/or reductant decomposition products flowing back in under engine operating conditions in which there is a reversal of the exhaust gas flow in direction of the internal combustion engine.

The exhaust gas aftertreatment system according to the invention advantageously makes it possible—without additional expenditure on control and regulation—to convert nitrogen oxides from the exhaust gas into nitrogen and water on the one hand and, on the other hand, ammonia or reductant or byproducts formed from the reductant are prevented from coming into contact with parts of the internal combustion engine contacting the exhaust gas because of the return flow of exhaust gases occurring under certain operating conditions of the internal combustion engine, so that these parts coming into contact with the exhaust gas are protected from the corrosion caused by this contact. The space requirement for the exhaust gas aftertreatment system according to the invention can advantageously be limited to a minimum by integrating at least one of the aforementioned catalyzers in a compensator. In an advantageous manner, a plurality of catalyzers, possibly together with a particle separator or particle filter, is arranged in a compensator.

An oxidation catalyzer which is integrated in the compensator can be constructed in such a way that it oxidizes the ammonia and/or reductant decomposition products flowing back and, on the other hand, oxidizes carbon monoxide and/or nitrogen monoxide and/or hydrocarbons that are carried along in the exhaust gas under engine operating conditions in which the exhaust gas flows in the normal direction, that is, away from the internal combustion engine. Accordingly, the above-mentioned exhaust gas components in the exhaust gas flow are advantageously converted into harmless compounds or into compounds that can be reclaimed in subsequent reactions. For example, the oxidation of nitrogen monoxide causes additional, highly reactive nitrogen dioxide to be added to the SCR reaction in the SCR catalyzer. During the above-mentioned oxidation of ammonia at the oxidation catalyzer arranged upstream of the feed point for the reductant, it is desirable that the reaction runs to the oxidation number of 0, that is, nitrogen.

$$4NH_3 + 3O_2 \Rightarrow 2N_2 + 6H_2O \tag{11}$$

But this does not always take place selectively, so the oxidation often continues to oxidation numbers [+1] (laughing gas, $N_2O$), [+2] (nitrogen monoxide, NO), or even [+4] (nitrogen dioxide, $NO_2$).

$$2NH_3 + 2.5O_2 \Rightarrow 2NO + 3H_2O\ [+2] \tag{12}$$

$$2NO + O_2 \Leftrightarrow 2NO_2\ [+4] \tag{13}$$

$$NH_3 + NO_2 \Rightarrow 2NO + H_2O\ [+2] \tag{14}$$

$$2NH_3 + 2NO_2 + \tfrac{1}{2}O_2 \Rightarrow 2N_2O + H_2O\ [+1] \tag{15}$$

In order to increase selectivity with respect to nitrogen, an additional SCR catalyzer for the selective reduction of nitrogen oxides by means of returning ammonia is advantageously arranged in the compensator in the partial exhaust gas flow downstream of the oxidation catalyzer and upstream of the feed point for the reductant. Accordingly, in an advantageous manner, returning ammonia is first oxidized to form nitrogen according to reactions (1) and (3) by means of nitrogen oxides contained in the partial flow of exhaust gas. This reaction runs in a highly selective manner so that the formation of unwanted byproducts such as laughing gas or nitrogen oxides is prevented.

It is only when there are no longer any nitrogen oxides present in the exhaust gas that ammonia and/or reductant decomposition products impinge on the clean oxidation catalyzer arranged upstream of the SCR catalyzer, where the reaction then runs substantially according to the reaction equation (11) with a sharply reduced amount of residual ammonia.

The additional SCR catalyzer also requires no additional installation space because it can be accommodated in the compensator. Of course, the oxidation catalyzer in the partial exhaust gas flow and the additional SCR catalyzer arranged downstream of the latter can be combined in an advantageous manner to form one structural component part, which helps to minimize the installation space requirement. In a particularly advantageous manner, the oxidation catalyzer in the partial exhaust gas flow is outfitted with SCR activity for nitrogen oxides, e.g., by means of a coating with correspondingly active catalyst material.

To promote the splitting off of ammonia from the reductant, a hydrolysis catalyzer can be arranged downstream of the feed point for the reductant. Further, at least one separator for separating particles from the exhaust gas is advantageously arranged downstream of the feed point for the reductant in the partial exhaust gas flow and/or in the exhaust gas flow. The hydrolysis catalyzer and the separator for separating particles can also be integrated in a compensator.

For purposes of assembly, the compensator is usually fixedly welded to short pipe pieces to form a structural component part. This provides the possibility for arranging all of the above-described structural component parts arranged in the partial exhaust gas flow, namely, the catalyzers, the feed device, e.g., the nozzle for the reductant, and possibly a particle separator for the partial exhaust gas flow, inside the compensator and/or inside the pipe pieces, that is, inside the part of the exhaust gas train that is permanently connected to the compensator. In this way, a very compact reductant supply arrangement can be provided in one structural component part.

Because of the arrangement of an additional oxidation catalyzer in the exhaust gas flow which at least partially converts the nitrogen monoxide contained in the exhaust gas flow into nitrogen dioxide in the normal flow direction of the exhaust gas, the increase in the proportion of nitrogen dioxide creates the necessary condition for the advantageous continuous regeneration of a separator arranged downstream in the partial exhaust gas flow for separating particles from the exhaust gas. On the other hand, there is also a higher proportion of highly reactive nitrogen dioxide available for the SCR reaction taking place downstream of the point where the partial exhaust gas flow is returned to the exhaust gas flow, which advantageously increases conversion to nitrogen oxides. Because the exhaust gas flow is guided away from the internal combustion engine at a different location from the partial exhaust gas flow, e.g., following the turbocharger, another compensator is needed in the exhaust gas flow in which the additional oxidation catalyzer can be integrated in an advantageous manner.

Platinum and/or palladium and/or iridium and/or oxides thereof and/or $IrTiO_X$ and/or zeolites can advantageously be used as active materials for the above-mentioned oxidation catalyzer for oxidizing ammonia and for the additional oxidation catalyzers.

With respect to the oxidation catalyzer arranged in the partial exhaust gas flow for oxidizing ammonia, it is advantageous that different properties are provided along the flow direction of the exhaust gas in such a way that the side adjacent to the feed point for the reductant preferably selectively oxidizes ammonia to form nitrogen and water, while the opposite side oxidizes carbon monoxide and/or nitrogen monoxide entrained in the exhaust gas and/or entrained hydrocarbons in an optimal manner with respect to conversion. This can be achieved in an advantageous manner in that the side adjacent to the feed point for the reductant contains more palladium and/or iridium and/or zeolites than the side facing the internal combustion engine. The same effect can be achieved when the side of the oxidation catalyzer adjacent to the feed point for the reductant has less platinum and/or oxides thereof than the side facing the internal combustion engine.

In an advantageous manner, vanadium and/or vanadium pentoxide and/or titanium dioxide and/or tungsten oxide and/or copper-containing zeolites and/or iron-containing zeolites and/or cobalt-containing zeolites are used as active components for the SCR catalyzers for reducing nitrogen oxides by means of ammonia. Titanium dioxide and/or silicon dioxide and/or aluminum oxide and/or zeolites can be used as active components for the hydrolysis catalyzer to improve the release of ammonia.

In internal combustion engines having exhaust gas turbochargers, it may be advantageous to arrange the branching of the partial exhaust gas flow, in which the reducing liquid is injected, upstream of the turbine of the exhaust gas turbocharger to provide the highest possible temperature level for the splitting off of ammonia. In case of a turbine with double-flow feed, where one flow is charged with exhaust gas by at least a first cylinder and the other flow is charged with exhaust gas by at least a second cylinder, the partial exhaust gas flow is advantageously branched off from one of the two flows. The cylinders of the flow from which the partial exhaust gas flow is branched off can be operated with engine parameters different than those of the cylinders of the other flow so that the ratios in the partial exhaust gas flow can advantageously be optimized with respect to the supplying of reductant, for example, by increasing the exhaust gas temperature in the start phase or in the low-load range.

In connection with an internal combustion engine with two exhaust gas turbochargers, where the turbine of one exhaust gas turbocharger is charged with exhaust gas by a first cylinder bank of the internal combustion engine and the turbine of the other exhaust gas turbocharger is charged with exhaust gas by a second cylinder bank of the internal combustion engine, the partial exhaust gas flow is advantageously branched off from the exhaust gas flow in front of the turbine of one of the two exhaust gas turbochargers. The cylinders of the cylinder bank from whose exhaust gas train the partial exhaust gas flow is branched off can then be operated with different engine parameters than those for the cylinders of the other cylinder bank. In this way, an advantageous optimization of the ratios in the partial exhaust gas flow with respect to the supply of reductant is also possible, for example, by increasing the exhaust gas temperature in the start phase or in the low-load range.

Further, it may be advantageous for exact metering of the reductant to arrange a throttle element in the partial exhaust gas flow which controls or regulates the spatial velocity of the exhaust gas and/or the amount of exhaust gas branched off.

In an advantageous manner, a check valve is arranged upstream of the feed point for the reductant so as to unburden the oxidation catalyzer admitting ammonia or reductant decomposition products due to the return flow of exhaust gas or the SCR catalyzer when internal combustion engines installed in vehicles are in overrun operation or in engine braking operation. Alternatively or in addition, it can be advantageous to use a controllable blocking element, e.g., in the form of an exhaust gas flap, which is arranged upstream of the feed point in the partial exhaust gas flow and which turns off the partial exhaust gas flow in case of emergency. A controllable flap of this kind could also advantageously serve as a throttle element which can be controlled or regulated and could be controlled by the engine control device which is provided in any case.

Further, it may be advantageous to arrange a catalyzer downstream of the SCR catalyzer for oxidizing ammonia so as to prevent an ammonia leak.

With respect to the oxidation catalyzers mentioned above which, as was stated, are used for different purposes, it is advantageous to optimize these oxidation catalyzers for their respective purposes and chemical reactions by selecting the most suitable active components.

In view of the substantial influence of the exhaust gas temperature and the nitrogen dioxide content in the exhaust gas on the efficiency of the exhaust gas aftertreatment system, it can be advantageous to change the exhaust gas temperature or the nitrogen dioxide content by varying the engine setting by means of the engine control device which is provided in any case. In particular, the exhaust gas temperature and the nitrogen dioxide content can be increased by changing the engine parameters or by supplying hydrocarbons to the exhaust gas flow in front of the oxidation catalyzer for oxidizing nitrogen monoxide (and/or hydrocarbon and/or carbon monoxide).

Further, it is advantageous to combine a plurality of the catalyzers contained in the exhaust gas aftertreatment system in a housing, e.g., of a compensator, and/or inside a part of the exhaust gas train which is permanently connected to the compensator to minimize costs for the system and especially to minimize the space requirement for installation in utility vehicles, for example. Particle separators or particle filters should advantageously be installed in such a way that they are exchangeable.

As was already mentioned, not only hydrolysis catalyzers or oxidation catalyzers, but also other component parts of the exhaust gas aftertreatment system such as all types of catalyzers, particle filters or particle separators as well as check valves or a blocking device can be integrated in one or more compensators and/or in the part of the exhaust gas train that is permanently connected to the compensators. This advantageously minimizes parts costs and the cost of assembly.

To ensure a fast light-off of the catalyzers after starting the internal combustion engine (cold start), it is advantageous to install the compensators with integrated component parts of the exhaust gas aftertreatment system close to the engine, which also complies with the function of the compensators.

With respect to the integration of component parts of the exhaust gas aftertreatment system in the compensators, it must always be ensured that the basic function of the compensator, namely, to absorb vibrations and thermal expansions of the exhaust gas train, is not impaired. For example, when using bellows or corrugated hoses which can compensate for large transverse movements, this means that the outer diameter of the aftertreatment components must be smaller than the inner diameter of the compensator because, otherwise, there could be contact between the compensator and the aftertreatment system during operation. This would lead to damage to the compensator and/or the exhaust gas aftertreatment system within a very short time.

If only the longitudinal movement of the exhaust gas train is compensated by means of a sliding sleeve or if the aftertreatment system is only installed in the pipe pieces adjoining the compensator, the aftertreatment system can make fixed contact. In other words, tolerances aside, the outer diameter of the aftertreatment components is equal to the inner diameter of the compensator.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
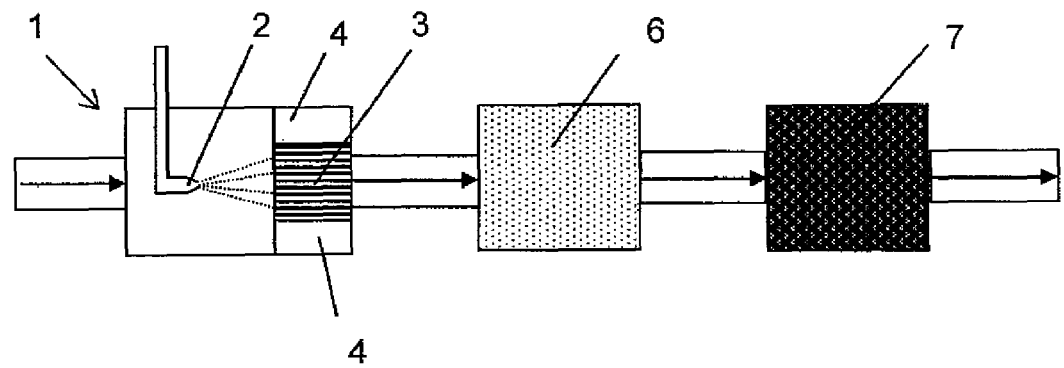
FIG. 1 shows an exhaust gas aftertreatment system with partial flow hydrolysis according to the prior art.

First, for purposes of background, a prior art arrangement for removing nitrogen oxides from the exhaust gas in an internal combustion engine by means of selective catalytic reduction is shown schematically in FIG. 1.

The exhaust gases, represented by arrows in FIG. 1, generated by an internal combustion engine (not shown) through combustion processes initially reaches an exhaust gas processing train 1 in which a reductant is added to the hot exhaust gas as close to the engine as possible. As is customary in practice in motor vehicles with SCR catalyzers, the reductant is an aqueous urea solution. Of course, urea can be added in solid form as has already been thoroughly described in the pertinent technical literature. Further, it is possible to add, as a reductant, ammonia which is obtained from another location, e.g., under favorable thermal conditions, from a substance which splits off ammonia. Metering is carried out depending on the operating parameters of the internal combustion engine so as to be controlled by the engine control unit (not shown) in such a way that the aqueous urea solution is injected into the exhaust gas flow by a nozzle 2 directly in front of a hydrolysis catalyzer 3. The purpose of the hydrolysis catalyzer 3 is to change the aqueous urea solution into ammonia and water vapor as completely as possible while preventing byproducts. Under certain conditions, this splitting is also carried out to a sufficient extent without a hydrolysis catalyzer so that the latter may be dispensed with. An oxidation catalyzer 4 is arranged in parallel with the hydrolysis catalyzer 3. Its purpose is to oxidize a portion of the nitrogen monoxide contained in the exhaust gas to form nitrogen dioxide according to the reaction designated above by equation (2) by means of the surplus oxygen present in the exhaust gas.

The actual selective catalytic reduction of the nitrogen oxides is carried out in a SCR catalyzer 6 which is located downstream of the hydrolysis catalyzer 3 and which converts the greatest possible proportion of nitrogen oxides ($NO_x$) contained in the exhaust gas into nitrogen and water vapor accompanied at the same time by high selectivity of the reduction and without any surplus ammonia ($NH_3$) remaining in the exhaust gas flow. The nitrogen dioxide present in the exhaust gas flow in the above-mentioned SCR reaction is more reactive than the nitrogen monoxide contained in the exhaust gas. Accordingly, it is desirable to design the oxidation catalyzer in such a way that the highest possible proportion of nitrogen monoxide is converted into nitrogen dioxide.

In view of the constantly changing operating conditions in an internal combustion engine operating in a motor vehicle, it is obvious that the desired highest possible conversion rate to nitrogen oxides can only be assured when a slight excess of ammonia is tolerated. In order to prevent the release into the atmosphere of toxic ammonia with the partially purified exhaust gas in cases of insufficient conversion, an $NH_3$ oxidation catalyzer 7 which changes the excess $NH_3$ into nitrogen and water vapor is arranged downstream of the SCR catalyzer 6. This oxidation reaction should take place as selectively as possible.

As was already indicated above, the hydrolysis catalyzer 3 can be omitted when the temperature level at the feed point for the reductant is high over the entire operating range.

Figure 2:
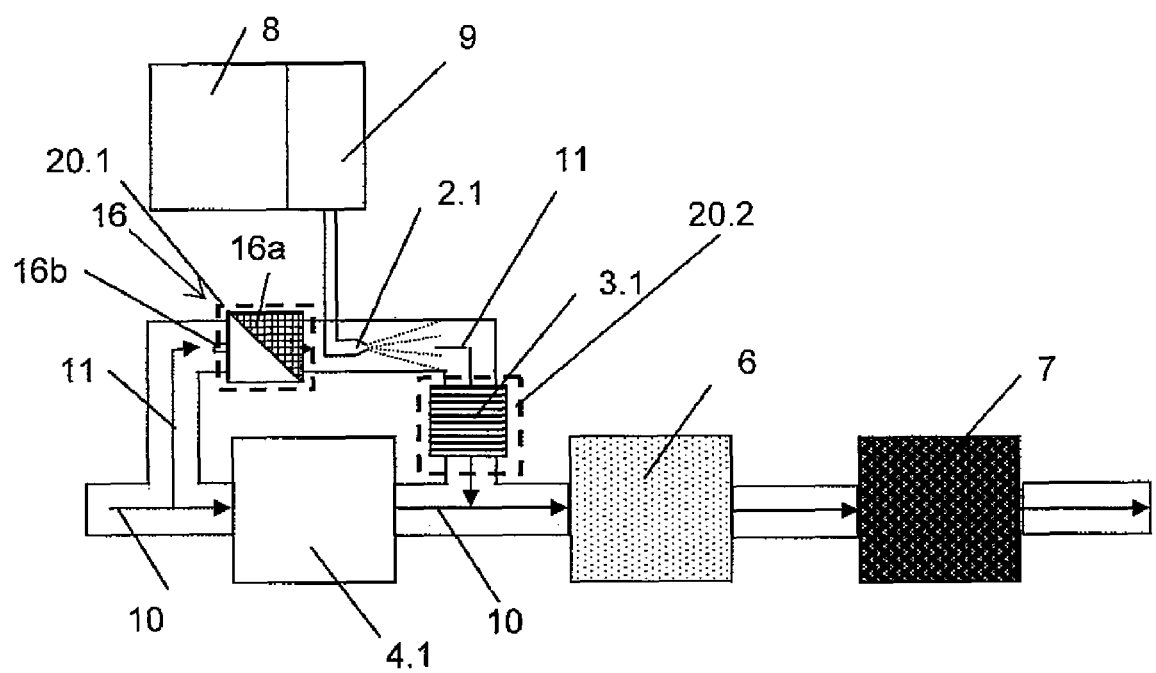
FIG. 2 shows a first SCR system with partial flow hydrolysis for the reductant and an oxidation catalyzer for preventing return flows in the partial flow.

An embodiment example of the exhaust gas aftertreatment system according to the invention is shown in FIG. 2.

The arrangement also makes use of partial flow hydrolysis. For this purpose, a partial exhaust gas flow 11 is branched off from the exhaust gas flow 10 and the reductant, in this example, aqueous urea solution (AdBlue), is added to the partial exhaust gas flow 11. Metering is carried out by means of a metering device 9 which is controlled as a function of the operating parameters of the internal combustion engine and which takes the aqueous urea solution from a reservoir 8 and injects it, via a nozzle 2.1, into the exhaust gas flow in preset amounts depending on the operating state of the internal combustion engine. A hydrolysis catalyzer 3.1 is arranged in the exhaust gas flow downstream of the feed point and, as was already stated above, advances the hydrolysis of the reductant. The partial exhaust gas flow 11 which is now loaded with ammonia is returned downstream of the hydrolysis catalyzer 3.1 and upstream of the SCR catalyzer 6 which is arranged in the exhaust gas flow 10 and which is followed by an $NH_3$ oxidation catalyzer 7. The SCR catalyzer 6 and $NH_3$ oxidation catalyzer 7 are identical to those described above referring to FIG. 1 and their operation need not be described again. Instead, reference is had to the relevant parts of the specification referring to FIG. 1.

As has already been stated, in certain operating states of the internal combustion engine, chiefly in low-load operation, overrun operation, engine braking operation, idling phases or when turning off the engine, a reversal of the flow direction of the exhaust gas can occur. An oxidation catalyzer 16 is arranged in the partial exhaust gas flow 11 upstream of the feed point for the reductant so that, in such cases, reductant, ammonia split off from the reductant, and/or byproducts formed from the reductant such as, e.g., isocyanic acid (Equation 9), cyanuric acid (Equation 10) are prevented from coming into contact with the parts of the engine in contact with the exhaust gas due to the return flow and/or diffusion in direction of the engine block. This oxidation catalyzer 16 is so designed with respect to its active components that it oxidizes returning reductant, ammonia split off from the reductant, or byproducts formed from the reductant. The active components of the oxidation catalyzer are selected in such a way that the oxidation of ammonia takes place as selectively as possible. Platinum, palladium, iridium, oxides thereof, $IrTiO_X$, and zeolites can be used as active materials for the oxidation catalyzer 16. It should be noted in this connection that a high proportion of platinum, while beneficial for the highest possible conversion, negatively affects the selectivity of the reaction.

Since the decomposition of urea is accelerated at high temperatures, it is advantageous to arrange the hydrolysis catalyzer 3.1 and, therefore, also the oxidation catalyzer 16 close to the engine. Since the compensators are usually also installed in the vicinity of the engine, it is convenient to integrate the two above-mentioned catalyzers in the compensators.

The function of the oxidation catalyzer 16 is expanded by designing it with different properties along the flow direction of the exhaust gas; the side 16a adjacent to the feed point for the reductant preferably oxidizes ammonia selectively to form nitrogen and water, whereas the opposite side 16b oxidizes carbon monoxide and/or nitrogen monoxide entrained in the exhaust gas and/or entrained hydrocarbons in an optimal manner with respect to conversion. This can be achieved by the side 16a adjacent to the feed point for the reductant having a higher content of palladium and/or iridium and/or zeolites than the side 16b facing the internal combustion engine. The same effect can be achieved when the side 16a of the oxidation catalyzer adjacent to the feed point for the reductant has less platinum and/or oxides thereof than the side 16b facing the internal combustion engine.

As was already stated, the partial exhaust gas flow 11 is returned to the exhaust gas flow 10 upstream of the SCR catalyzer 6. The return point should be located as directly in front of the SCR catalyzer as possible in order to prevent exhaust gas charged with ammonia from flowing back into the exhaust gas flow 10. However, if there is nevertheless a slight backflow into the exhaust gas flow 10, the returning ammonia is oxidized by the additional oxidation catalyzer 4.1 arranged in the exhaust gas flow 10 parallel to the partial exhaust gas flow 11. The additional oxidation catalyzer 4.1 serves to increase the proportion of nitrogen dioxide in the exhaust gas flow 10 in order to improve the conversion of nitrogen oxides that can be achieved by the SCR reaction and is therefore arranged in parallel with the partial exhaust gas flow 11 because, in doing so, the temperature level in the partial exhaust gas flow 11 and particularly at the feed point for the reductant is not negatively influenced. This would not be the case were the relatively large additional oxidation catalyzer 4.1 arranged upstream of the partial exhaust gas flow 11.

In this arrangement, the oxidation catalyzer 16 and hydrolysis catalyzer 3 could be integrated in compensators 20.1 and 20.2.

With respect to the oxidation of ammonia at the oxidation catalyzer 16 arranged upstream of the feed point for the reductant, the reaction should take place as selectively as possible, that is, up to an oxidation number of 0 (Equation 11). However, this does not always take place selectively, and the oxidation often proceeds up to oxidation numbers of [+1] (laughing gas—$N_2O$), [+2] (nitrogen monoxide—NO), or even [+4] (nitrogen dioxide—$NO_2$) (Equations (12) to (15)), as was already stated. A remedy is provided by an arrangement according to FIG. 3. This arrangement differs from the arrangement according to FIG. 2 only in that an additional SCR catalyzer 17 is arranged in the partial exhaust gas flow 11 downstream of the oxidation catalyzer 16 and upstream of the feed point for the reductant. This additional SCR catalyzer 17 changes any returning ammonia into nitrogen and water vapor in a highly selective manner by means of nitrogen monoxide and residual oxygen contained in the exhaust gas according to Equation (1) or by means of nitrogen monoxide and nitrogen dioxide according to Equation (3). The oxidation of the ammonia by means of the oxidation catalyzer 16 does not take place until the nitrogen oxides in the exhaust gas are depleted.

In this arrangement, the oxidation catalyzer 16, the SCR catalyzer 17, and the hydrolysis catalyzer 3 could be integrated in separate compensators 20.3, 20.4 and 20.5.

Figure 3:
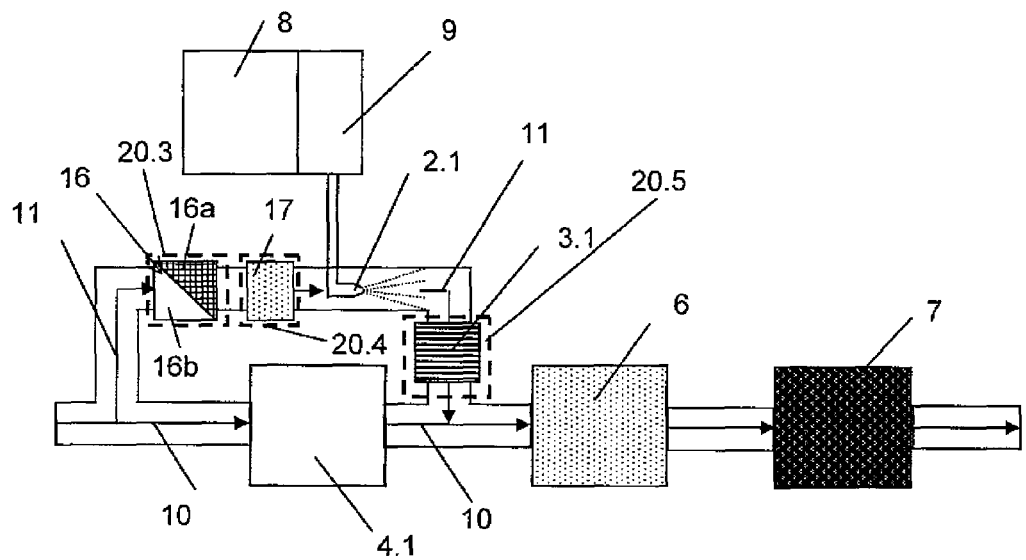
FIG. 3 shows a second SCR system with partial flow hydrolysis for the reductant and an oxidation catalyzer for preventing return flows in the partial flow.

Since the structural components and functioning of the arrangement according to FIG. 3 are identical in the arrangement described referring to FIG. 2, with the exception of the details mentioned above, reference is had to the relevant portions of the description referring to FIG. 2.

Figure 4:
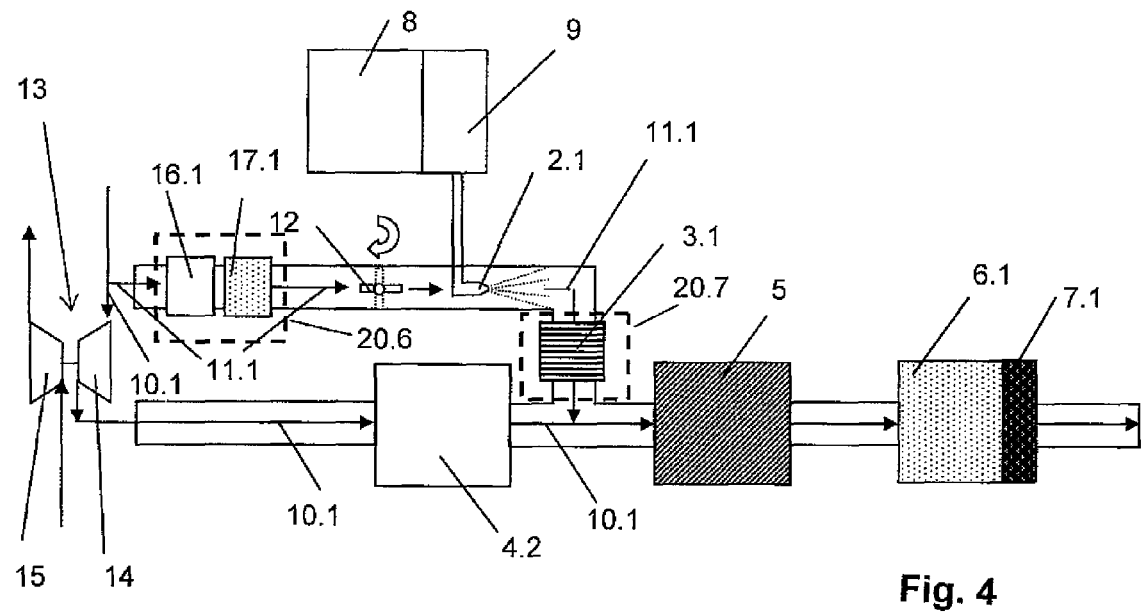
FIG. 4 shows an exhaust gas aftertreatment system with partial flow hydrolysis and prevention of return flow in the partial flow for internal combustion engines with turbochargers.

At the present time, internal combustion engines operating in utility vehicles are often provided with a turbocharger arrangement having at least one stage, which turbochargers compress the combustion air supplied to the internal combustion engine by means of the exhaust gas enthalpy contained in the exhaust gas flow. This causes problems for the aftertreatment of exhaust gas because the exhaust gas flowing through the turbines of the one or more exhaust gas turbochargers is heavily cooled in a compulsory manner in this way. An exhaust gas flow that is cooled off in this manner is not capable of achieving adequate exhaust gas temperatures for the hydrolysis of the reductant, particularly during startup operation and in the lower partial-load range. Even when hydrolysis catalyzers are used, the temperature level is usually not sufficient. This problem is solved by the arrangement according to FIG. 4. As is shown in FIG. 4, the exhaust gas flow coming from the internal combustion engine (not shown) branches off already before the turbine 14 of the exhaust gas turbocharger 13 in such a way that a partial exhaust gas flow 11.1 is removed from the exhaust gas flow, while the rest of the exhaust gas is guided via the turbine 14, drives the compressor 15 by means of the latter, and exits the turbocharger as exhaust gas flow 10.1.

The hydrolysis of the reductant takes place in the partial exhaust gas flow 11.1 in this example as well. For this purpose, the reductant is fed to the partial exhaust gas flow 11.1 by a metering arrangement including a reservoir 8, a metering device 9 and a nozzle 2.1. Because of the relatively high exhaust gas temperature in the partial exhaust gas flow 11.1 and the hydrolysis catalyzer arranged downstream of the feed point, the reductant can split off ammonia without the formation of problematic reaction products such as cyanuric acid and ammonia.

Parallel to the partial exhaust gas flow 11.1, the exhaust gas flow 10.1 coming from the exhaust gas turbocharger 13 is guided via an oxidation catalyzer 4.2 which oxidizes nitrogen monoxide contained in the exhaust gas flow 10.1 to form nitrogen dioxide as in the examples described above. The partial exhaust gas flow 11.1 is fed back into the exhaust gas flow 10.1 downstream of the oxidation catalyzer 4.2. Because of the great differences in temperature between the main flow and the partial flow, it is indispensable to install compensators. The hydrolysis catalyzer and the oxidation catalyzers 4.2 for oxidizing NO and/or the catalyzers 16.1 for oxidizing urea decomposition products can be integrated in compensators.

The exhaust gas which comes from the partial exhaust gas flow 11.1 and which is charged with ammonia and the exhaust gas which is enriched with nitrogen dioxide from the exhaust gas flow 10.1 then flow through a particle separator 5 which is arranged downstream of the return point and which ensures that the constituents contained in the exhaust gas are thoroughly mixed and homogeneously distributed and accumulates soot particles from the exhaust gas which are continuously converted to carbon monoxide, carbon dioxide, nitrogen and nitrogen monoxide by means of the nitrogen dioxide generated in the oxidation catalyzer 4.2. A SCR catalyzer 6.1 is arranged downstream of the particle separator 5 and converts the nitrogen oxides present in the exhaust gas into nitrogen and water vapor by means of selective catalytic reduction. The SCR catalyzer 6.1 is coated in its downstream area with an active material forming an $NH_3$ oxidation catalyzer 7.1 to prevent ammonia leaks.

A combination of an oxidation catalyzer 16.1 and an SCR catalyzer 17.1 arranged downstream of the oxidation catalyzer 16.1 in the normal flow direction of the exhaust gas indicated by the arrow, is arranged between the branching off of the partial exhaust gas flow 11.1 and the feed point of the reductant. This combination prevents damage to the parts of the internal combustion engine in contact with exhaust gas owing to exhaust gas which flows back in certain operating states and which is charged with ammonia split off from the reductant or byproducts formed by the splitting. The oxidation catalyzer 16.1 provided in this combination acts in such a way in the normal flow direction of the exhaust gas indicated by the arrow that nitrogen monoxide is converted into nitrogen dioxide. However, if the exhaust gas flow is reversed, e.g., in engine braking operation, the ammonia contained in the exhaust gas is changed into nitrogen and water vapor according to Equations (1) and (3) when flowing through the SCR catalyzer 17 by means of the nitrogen oxides or residual oxygen contained in the exhaust gas. If there are no longer any nitrogen oxides present in the exhaust gas, the oxidation of returning ammonia is carried out in the oxidation catalyzer 16.1.

In order to unburden the above-mentioned combination of SCR catalyzer 17.1 and oxidation catalyzer 16.1 during flowback phases of longer duration, a blocking member 12 which is controllable by means of an engine control device (not shown) depending on the operating parameters of the internal combustion engine is provided between the SCR catalyzer 17.1 and the feed point for the reductant. The operating parameters of the internal combustion engine in which blocking takes place can be determined by the engine control unit by means of sensors and/or by means of parameters stored in the engine control unit.

Further, the blocking member 12 can be used to control or regulate the mass flow or the amount of exhaust gas in the partial exhaust gas flow 11.1 in operating states in which the exhaust gas flows in the normal flow direction, that is, in the direction indicated by the arrows. For this purpose, a throttling of the partial exhaust gas flow 11.1 is carried out continuously or in discrete steps depending on the operating parameters of the internal combustion engine. The variability of the partial exhaust gas flow which is achieved in this way makes it possible to more accurately control the ammonia concentration in the exhaust gas that is required for the SCR reaction.

Since the oxidation catalyzer 16.1 and the SCR catalyzer 17.1 are installed very close to the engine, the two catalyzers could be integrated in a common compensator 20.6. However, the hydrolysis catalyzer 3.1 arranged downstream of the end location is installed in a separate compensator 20.7.

In contrast to the example shown in FIG. 4, the blocking member 12 can also naturally be arranged at any other desired location between the branching off of the partial exhaust gas flow 11.1 and the feed point of the reductant. Further, it is also conceivable to provide a corresponding blocking member in the arrangements according to FIGS. 2 and 3. Finally, the arrangement can be simplified by providing a simple check valve which closes when there is a reversal of flow in the partial exhaust gas flow 11.1 instead of the controlled or regulated blocking member 12.

Of course, the blocking member 12 or check valve can be integrated in the compensator 20.6. Naturally, this also applies to the nozzle 2.1 which can be located in the compensator 20.7, e.g., together with the hydrolysis catalyzer 3.1.

If, in contrast to the example according to FIG. 4, the turbine 14 is a turbine with double-flow feed, where one flow is charged with exhaust gas by at least a first quantity of cylinders and the other flow is charged with exhaust gas by a second quantity of cylinders, the partial exhaust gas flow is advantageously branched off from one of the two flows. The cylinders of the flow from which the partial exhaust gas flow is branched off can be operated with engine parameters (e.g., fuel injection times or quantities) different than those of the cylinders of the other flow so that the ratios in the partial exhaust gas flow can be optimized with respect to the preparation of the reductant, for example, by increasing the exhaust gas temperature in the start phase or in the low-load range is increased, e.g., by after-injection in the power stroke or exhaust stroke.

Internal combustion engines with two banks of cylinders usually have a separate exhaust gas turbocharger for each cylinder bank so that the turbine of one exhaust gas turbocharger is charged with exhaust gas by one cylinder bank of the internal combustion engine and the turbine of the other exhaust gas turbocharger is charged with exhaust gas by the other cylinder bank of the internal combustion engine. In this case the partial exhaust gas flow is advantageously branched off from the exhaust gas flow in front of the turbine of one of the two exhaust gas turbochargers. The cylinders of the cylinder bank from whose exhaust gas train the partial exhaust gas flow is branched off can then be operated with different engine parameters (e.g., fuel injection timing or quantity) than those for the cylinders of the other cylinder bank. In this way, an advantageous optimization of the ratios in the partial exhaust gas flow with respect to the preparation of the reductant is also possible in this case in that, for example, the exhaust gas temperature in the start phase or in the low-load range is increased, e.g., by after-injection in the power stroke or exhaust stroke.

It should be noted with respect to the catalyzers mentioned in the examples above that they are full catalyzers and/or coating catalyzers. The active components of the catalyzers can be arranged on ceramic and/or metallic and/or silicon-containing and/or quartz-containing substrates. Such catalyzers can be produced by many known production methods. In this respect, reference is had expressly to the pertinent technical literature.

Platinum and/or palladium and/or iridium and/or oxides thereof and/or $IrTiO_X$ and/or zeolites can be used as active materials for the oxidation catalyzer in the preceding examples for oxidizing ammonia and for the additional oxidation catalyzers. Vanadium and/or vanadium pentoxide and/or titanium dioxide and/or tungsten oxide and/or copper-containing zeolites and/or iron-containing zeolites and/or cobalt-containing zeolites are used as active components for the SCR catalyzers for reducing nitrogen oxides by means of ammonia. Titanium dioxide and/or silicon dioxide and/or aluminum oxide and/or zeolites can be used as active components for the hydrolysis catalyzer to improve the release of ammonia.

Further, it may be useful to accommodate a plurality of catalyzers and/or particle separators in a common housing in order to save installation space and lower costs.

When particle separators or particle filters are used they may become clogged by engine oil ashes, so that it may be useful to install the filters in such a way that they can be exchanged and therefore easy to clean.

In order for the exhaust gas aftertreatment system to operate in its optimal operating range, the exhaust gas temperature and/or the content of nitrogen dioxide at the devices for separating particles can be changed by adjusting engine parameters and/or by increasing the hydrocarbon concentration by means of adjusting engine parameters such as fuel injection timing or quantity and/or by supplying hydrocarbons in the exhaust gas flow upstream of the catalyzers for oxidizing nitrogen monoxide which simultaneously bring about the oxidation of hydrocarbons and/or carbon monoxide.

Figure 5:
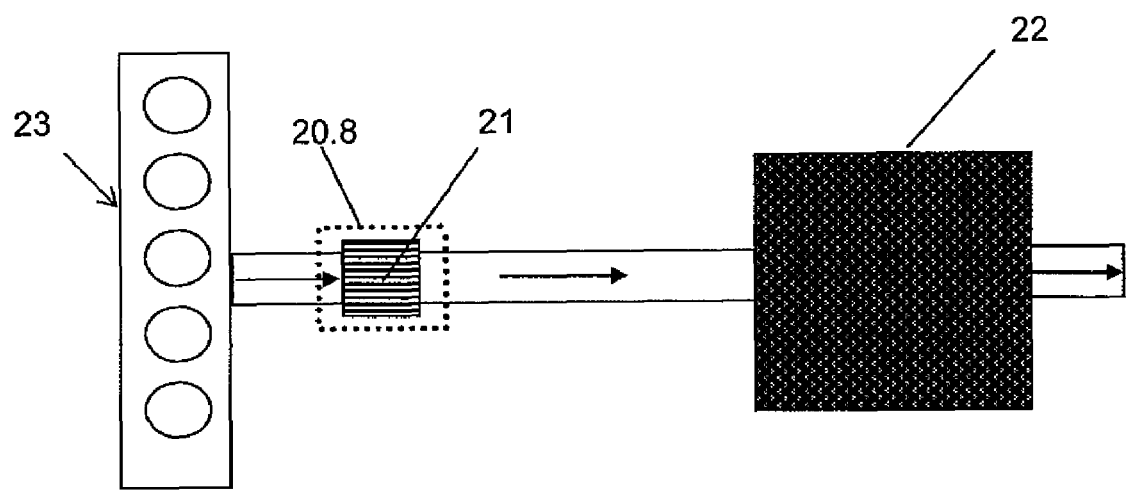
FIG. 5 shows an exhaust gas aftertreatment system with a starting catalyzer integrated in a compensator in the vicinity of the engine and a main catalyzer arranged downstream.

In FIG. 5, the aftertreatment system is divided into a small starting catalyzer 21 installed close to the internal combustion engine 23 and a main catalyzer 22 arranged downstream. Both catalyzers may be of the same type, e.g., three-way catalyzers. The purpose of this division is to reach the light-off temperature of the aftertreatment system already just after starting the engine by means of a rapid heating of the starting catalyzer. Since the starting catalyzer 21 and main catalyzer 22 are exposed to appreciably different thermal loading, their catalyzer compositions usually differ even if they are catalyzers of the same type. In this arrangement, the small starting catalyzer 21 could be integrated in the compensator 20.8.

As was already mentioned, the compensators 20.1 to 20.8 mentioned in connection with FIGS. 2 to 5 can be implemented in different ways. Some examples are illustrated in the following.

Figure 6:
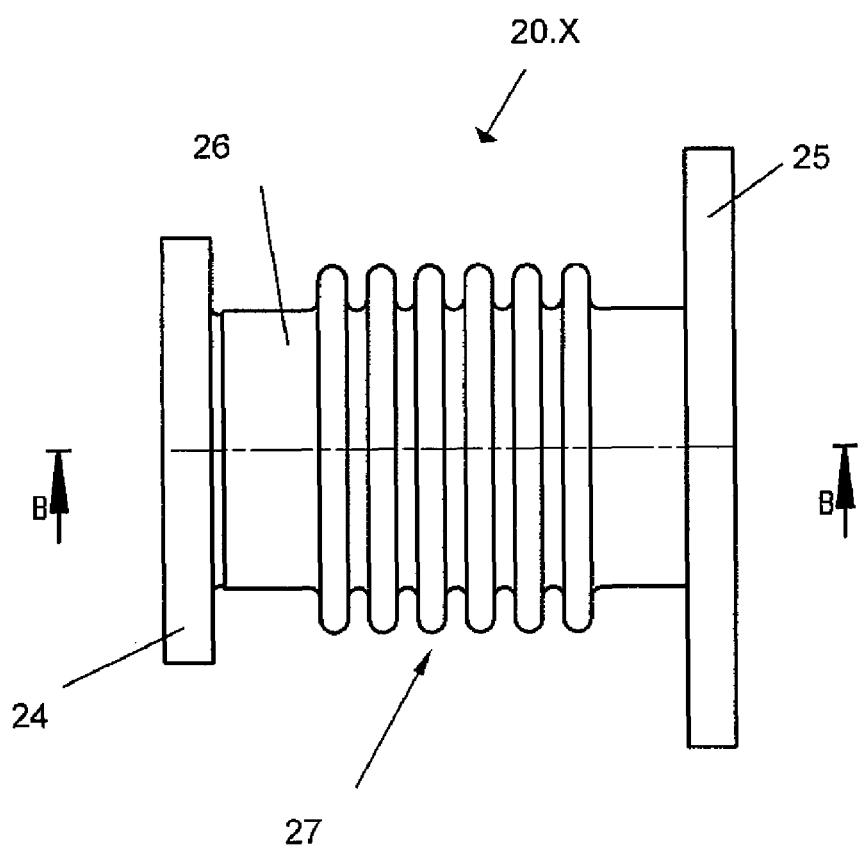
FIG. 6 is a top view showing a compensator which is constructed as a bellows-shaped corrugated pipe.

A bellows-like arrangement of a compensator 20.X is shown in FIG. 6. In this case, the connection areas by which the compensator 20.X is connected to the exhaust gas pipe installation (not shown) is formed by a first flange 24 and a second flange 25. A connection pipe 26 having in its central area a corrugated pipe portion 27 shaped like bellows extends between the flanges 24, 25. The two flanges 24, 25 are fixedly connected to the connection pipe 26 so that when the compensator 20.X is mounted in the exhaust gas pipe installation (not shown) and the exhaust gas pipe portions connected to the compensator 20.X move relative to one another in any direction this movement is compensated by the corrugated pipe portion.

Figure 7:
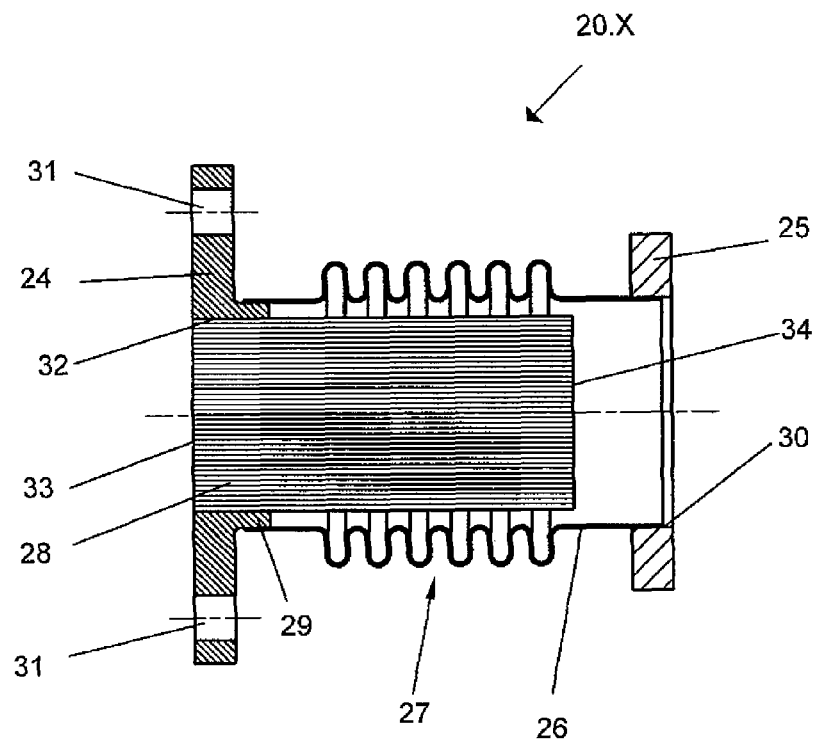
FIG. 7 shows a section through the compensator shown in FIG. 6 with integrated catalyzer which is permanently connected to the compensator at section plane B-B.

The fastening of a catalyzer 28 in the compensator 20.X is shown in FIG. 7 in a section through the compensator 20.X according to FIG. 6 along line B-B. As can be seen, the connection pipe 26 extends between the flanges 24, 25 and is fitted to a cylindrical projection 29 arranged at the first flange 24 and connected to the latter by a positive engagement, e.g., by welding. The other end of the connection pipe 26 is inserted into a recess 30 located in the second flange 25. There is also a positive engagement, e.g., by welding, between the second flange 25 and the connection pipe 26. One end of the catalyzer 28 is inserted into an opening 32 which penetrates the center of the first flange 24 and the cylindrical projection 29 arranged at the latter and is fastened in this recess 32 in a positive engagement. The free end 34 of the catalyzer 28 projects into the connection pipe 26 and is spaced from the inner wall of the connection pipe 26 so that there is no contact between the catalyzer 28 and the connection pipe 26 during relative movements between the first flange 24 and the second flange 25. FIG. 7 also shows bore holes 31 in the first flange 24 which are used to fasten the compensator 20.X to the exhaust gas pipe installation (not shown) by means of screws (not shown).

Figure 8:
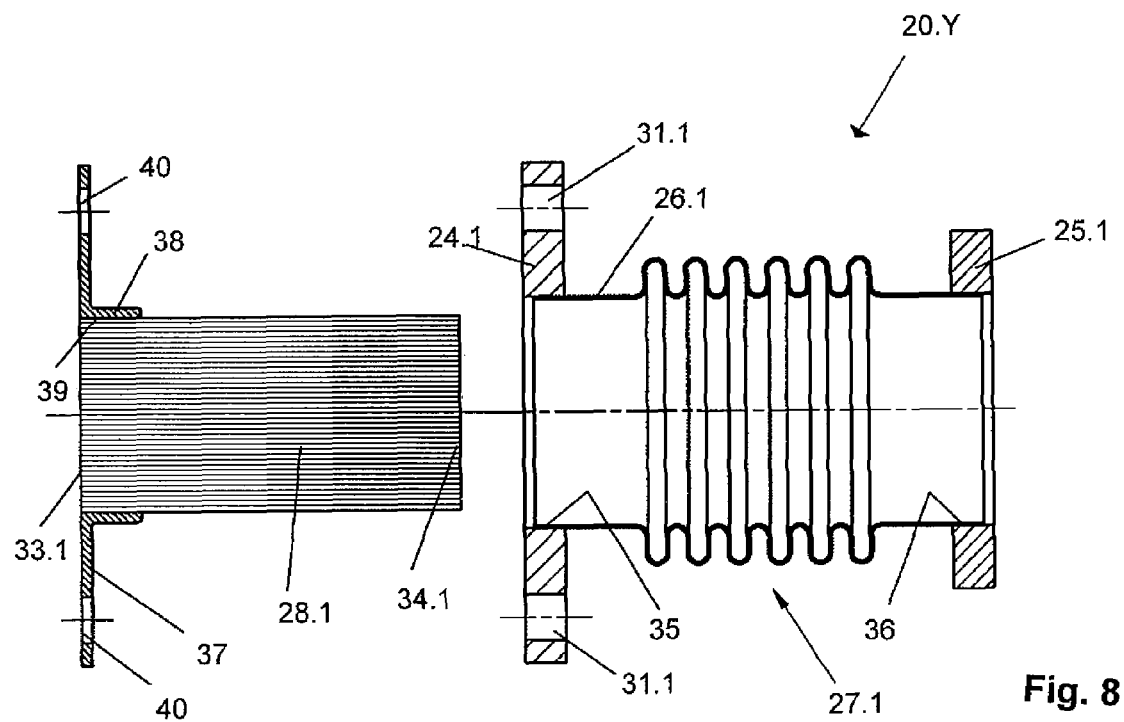
FIG. 8 shows a section through a compensator and catalyzer, wherein the catalyzer can be detachably connected to the compensator.

FIG. 8 shows, likewise in section, a construction of a compensator 20.Y in which the catalyzer arranged therein can be easily disassembled. In this case also, a first flange 24.1 and a second flange 25.1 are connected by means of a connection pipe 26.1 having a bellows-shaped corrugated pipe portion 27.1 in its central area. The first flange 24.1 and the second flange 25.1 each have a central recess 35, 36 into which the connection pipe 26.1 is inserted by one end and connected to the flanges 24.1, 25.1 by positive engagement.

In the disassembled position, a catalyzer 28.1, shown on the left-hand side in FIG. 8, is arranged in another flange 37 having a projection 38. The flange 37 and projection 38 are penetrated centrally by a recess 39 in which the catalyzer 28.1 is arranged in a positive engagement. Through-holes 40 are arranged in the flange 37 for fastening the catalyzer 28.1 in the compensator 20.Y. These through-holes 40 are aligned with the bore holes 31.1 in the first flange 24.1 in the assembled state of the catalyzer. The bore holes 31.1 and the through-holes 40 are used at the same time for fastening the catalyzer 28.1 in the compensator 20.Y and for fastening this arrangement to the exhaust gas pipe installation (not shown).

Figure 9:
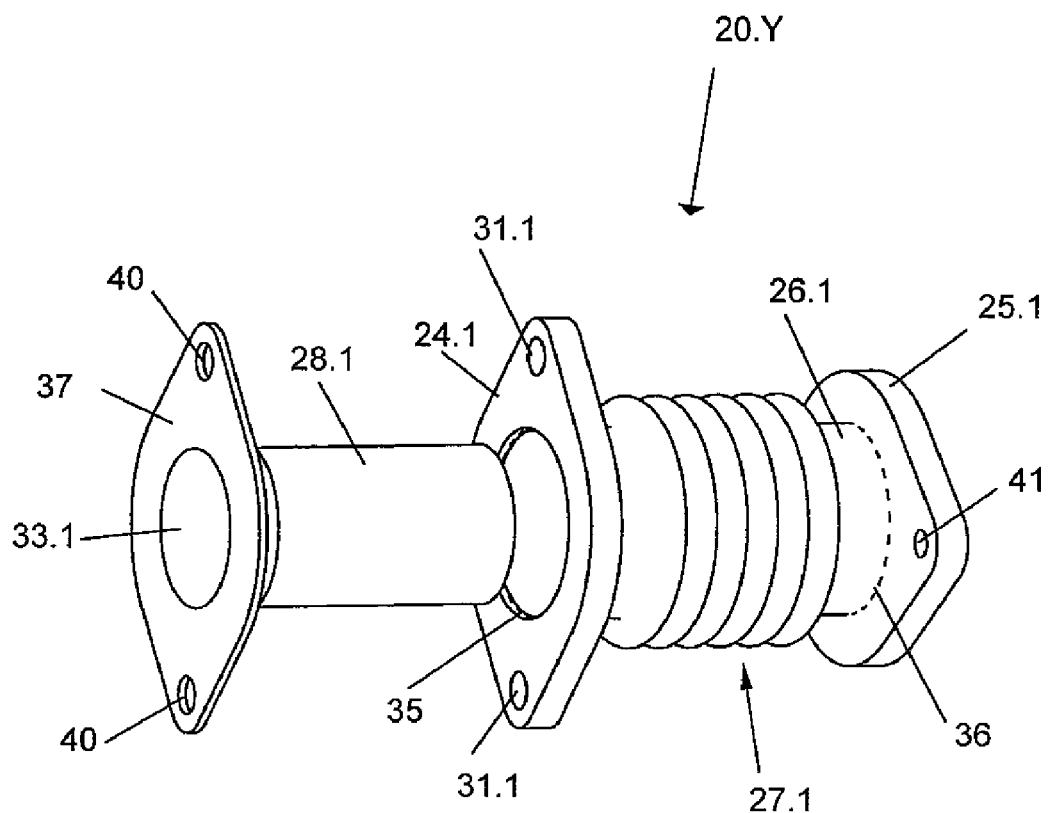
FIG. 9 is a top view of the compensator shown in FIG. 8 with the catalyzer removed.

FIG. 9 shows a perspective view of the arrangement described with reference to FIG. 8. Since the arrangements in FIGS. 8 and 9 are identical, the reference numbers are also the same. Only the additional features shown in this embodiment will be discussed with reference to FIG. 9. For other details, reference is had to the description relating to FIG. 8.

FIG. 9 shows that the flanges 24.1 and 25.1 are offset by 90° relative to one another. This is meant to facilitate assembly because the flanges do not impede one another. The fastening of the second flange 25.1 to the adjoining exhaust gas pipe installation (not shown) is carried out by means of the bore holes 41 by which the flange 25.1 is fastened by screws to a corresponding piece at the exhaust gas pipe installation (not shown).

Figure 10:
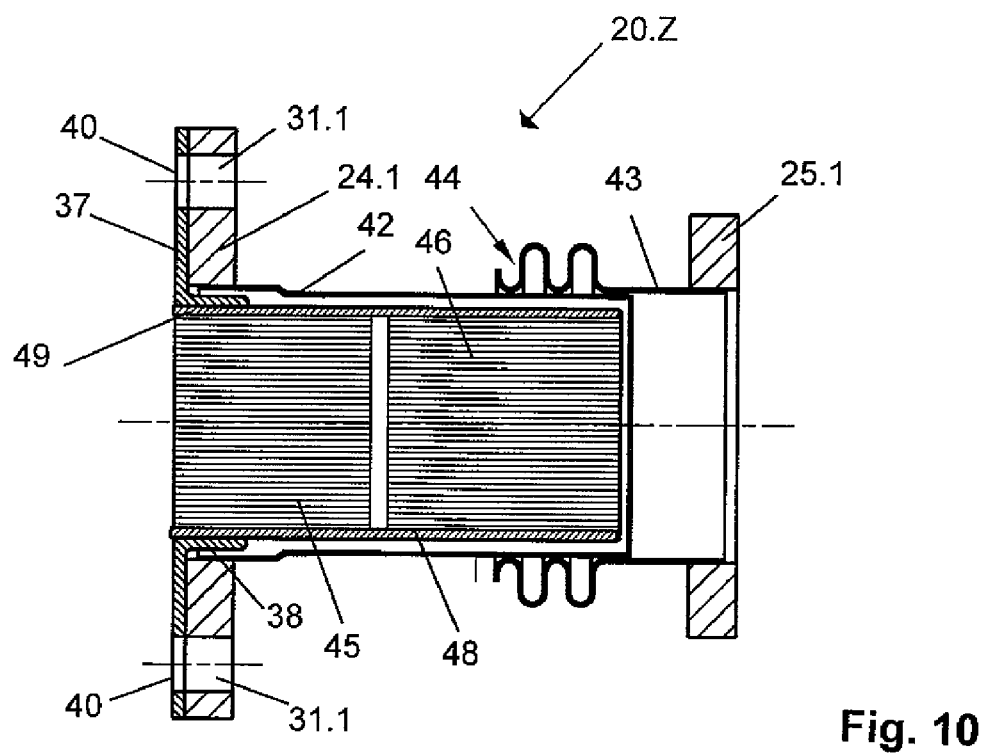
FIG. 10 shows a section through a compensator and a catalyzer, wherein the compensator is constructed as a sliding sleeve.

Another type of compensator is shown in section in FIG. 10. Since the arrangement shown here differs from the arrangement shown in FIGS. 8 and 9 only in a few respects, only these differences will be discussed. Identical parts in the examples shown in FIGS. 8 and 9 are provided with identical reference numbers. Reference is had to these drawings for a description of these parts.

The arrangement according to FIG. 10 shows a compensator 20.Z constructed as a sliding sleeve. The sliding sleeve is formed by a first pipe piece 42 and a second pipe piece 43 whose inner diameter corresponds to the outer diameter of the first pipe piece 42. The second pipe piece 43 is fitted to the first pipe piece 42, and the part 44 of the second pipe piece 43 which is fitted to the first pipe piece 42 is constructed in the form of a corrugated pipe. On one hand, the corrugated shape serves to minimize contact between the two pipe parts so that the two pipe parts can slide relative to one another more easily. On the other hand, a sufficient sealing action is achieved. The first pipe piece 42 is fastened to the first flange 24.1 and the second pipe piece is fastened to the second flange 25.1 in a positive engagement by soldering or by welding. The compensator 20.Z allows relative movements of the pipe pieces 42, 43 in axial direction only.

The catalyzer arrangement in FIG. 10 also differs from that in FIG. 8 in that in the example shown in FIG. 10 a first catalyzer 45 is combined with a second catalyzer 46. The two catalyzers are arranged in a carrier pipe 48 which is mounted in a positive engagement by one end 49 in the additional flange 37. The first catalyzer 45 can be an oxidation catalyzer and the second catalyzer 46 can be a SCR catalyzer and both are arranged adjacent to one another in the partial exhaust gas flow of the exhaust gas aftertreatment system as in the examples according to FIGS. 3 and 4.

Of course, the constructions described above can be carried out in a variety of ways based on the know-how of the person skilled in the art without departing from the basic inventive idea. Within this meaning, the embodiment forms described above are given by way of example.

The invention is not limited by the embodiments described above which are presented as examples only but can be modified in various ways within the scope of protection defined by the appended patent claims.

We claim:

1. An apparatus for installation in an exhaust gas train of an internal combustion engine, the exhaust gas train comprising a main exhaust and a branch exhaust that branches off from and rejoins the main exhaust, the apparatus comprising:
    at least one compensator for compensating relative movements between part of the exhaust gas train and at least one of the internal combustion engine and another part of the exhaust gas train;
    a reservoir containing a reductant which splits off ammonia when heated;
    a metering device for adding said reductant to a partial exhaust gas flow at a feed point in the branch exhaust;
    an SCR catalyzer in the main exhaust downstream of where the branch exhaust rejoins the main exhaust, wherein the SCR catalyzer reduces nitrogen oxides in the exhaust gas to nitrogen and water vapor by means of the split-off ammonia; and
    an oxidation catalyzer in the branch exhaust upstream of the feed point, wherein the oxidation catalyzer oxidizes at least one of ammonia and reductant decomposition products in the exhaust gas under engine operating conditions in which the exhaust gas flows toward the internal combustion engine;
    wherein the oxidation catalyzer is arranged inside at least one of the compensator and a part of the exhaust gas train permanently connected to the compensator, and
    wherein the at least one of the compensator and the part of the exhaust gas train permanently connected to the compensator has an inside diameter that is larger than the outside diameter of the oxidation catalyzer arranged therein.

2. The apparatus of claim 1 wherein the compensator is one of a bellows, a corrugated hose, and a sliding sleeve.

3. The apparatus of claim 1 wherein the oxidation catalyzer oxidizes at least one of carbon monoxide and nitrogen monoxide and hydrocarbons in the exhaust gas under engine operating conditions in which the exhaust gas flows away from the internal combustion engine.

4. The apparatus of claim 1 further comprising an additional SCR catalyzer in the branch exhaust downstream of the oxidation catalyzer and upstream of the feed point for selective reduction of nitrogen oxides by means of returning ammonia, wherein the additional SCR catalyzer is arranged inside the at least one of the compensator and a part of the exhaust gas train permanently connected to the compensator.

5. The apparatus of claim 4 wherein the oxidation catalyzer and the additional SCR catalyzer are combined to form one structural component arranged inside the at least one of the compensator and a part of the exhaust gas train permanently connected to the compensator.

6. The apparatus of claim 1 wherein the oxidation catalyzer has an SCR activity for nitrogen oxides.

7. The apparatus of claim 4 further comprising one of a blocking device and a check valve in the branch exhaust upstream of the feed point and downstream of the additional SCR catalyzer.

\* \* \* \* \*